US010633620B2

(12) United States Patent
DeCaro et al.

(10) Patent No.: US 10,633,620 B2
(45) Date of Patent: Apr. 28, 2020

(54) ACCELERATED SPIRIT/BEVERAGE AGING AND FLAVOR LOADING METHODS AND SYSTEMS

(71) Applicants: Mark DeCaro, Millstone, NJ (US); Guobao Wei, Milltown, NJ (US)

(72) Inventors: Mark DeCaro, Millstone, NJ (US); Guobao Wei, Milltown, NJ (US)

(73) Assignees: Mark DeCaro, Millstone Township, NJ (US); Guobao Wei, Milltown, NJ (US)

( * ) Notice: Subject to any disclaimer, the term of this patent is extended or adjusted under 35 U.S.C. 154(b) by 221 days.

(21) Appl. No.: 15/803,764

(22) Filed: Nov. 4, 2017

(65) Prior Publication Data

US 2018/0057780 A1 Mar. 1, 2018

Related U.S. Application Data

(60) Provisional application No. 62/420,506, filed on Nov. 10, 2016.

(51) Int. Cl.
*C12G 3/07* (2006.01)
*A23L 2/56* (2006.01)

(52) U.S. Cl.
CPC . *C12G 3/07* (2019.02); *A23L 2/56* (2013.01)

(58) Field of Classification Search
CPC .................................. A23L 2/56; C12H 1/22
USPC ........... 426/592, 422, 11; 99/277.1; 210/644
See application file for complete search history.

(56) References Cited

U.S. PATENT DOCUMENTS

| 3,942,423 A | 3/1976 | Herzfeld |
| 4,350,708 A | 9/1982 | Ruiz de Palacios |
| 4,956,194 A | 9/1990 | Gos |
| 6,378,419 B1 | 4/2002 | Ecklein |

(Continued)

FOREIGN PATENT DOCUMENTS

| FR | 3026337 A1 * | 4/2016 | ............... C12G 3/07 |
| WO | WO-2011114331 A2 * | 9/2011 | ............... C12J 1/08 |
| WO | WO-2016046481 A1 * | 3/2016 | ............... C12G 3/07 |

OTHER PUBLICATIONS

English Machine Translation WO2016046481 A1; ip.com (Year: 2016).*

(Continued)

*Primary Examiner* — Nina Bhat

(57) ABSTRACT

Accelerated spirit or beverage aging methods and associated systems are provided. One aging method is to soak selected wood fibers or chips with spirits or beverages in presence of subcritical, critical, and supercritical carbon dioxide. Another aging method is to treat selected wood fibers or chips in subcritical, critical, and supercritical carbon dioxide followed by soaking with spirits and/or beverages. A system for spirit or beverage aging and/or wood treatment is also provided. The system is comprised of a carbon dioxide supply device; a subcritical, critical, and supercritical carbon dioxide performance vessel; a mesh cage device; and a carbon dioxide separation and recycle device. Wood or treated wood can be further impregnated with natural flavors, vitamins, minerals, antioxidants, and therapeutics in a subcritical, critical, and supercritical carbon dioxide environment. Treated wood and/or impregnated wood is then combined with spirit/beverage and soaked in ambient, vacuum, pressure, or CO2 environment to obtain an aged and flavor enriched spirit or beverage.

19 Claims, 7 Drawing Sheets

(56) References Cited

U.S. PATENT DOCUMENTS

| | | | |
|---|---|---|---|
| 6,506,430 B1* | 1/2003 | Zimlich, III | C12G 3/005 426/330.4 |
| 6,869,630 B2* | 3/2005 | Gross, II | C12G 3/07 99/277.1 |
| 6,966,250 B2 | 11/2005 | Eustis | |
| 7,220,439 B2 | 5/2007 | Leonhardt et al. | |
| 8,343,562 B2* | 1/2013 | Bates | A23F 3/18 426/238 |
| 8,689,678 B2 | 4/2014 | Eustis | |
| 9,212,343 B1 | 12/2015 | Karasch et al. | |
| 9,416,340 B2 | 8/2016 | Kyle | |
| 9,745,545 B2 | 8/2017 | Niazi | |
| 10,041,027 B2* | 8/2018 | Evans | B27M 1/06 |
| 10,226,716 B2* | 3/2019 | Fabbian | B01D 3/001 |
| 2002/0168446 A1 | 11/2002 | Zimlich, III et al. | |
| 2005/0123658 A1* | 6/2005 | Tyler, III | C12H 1/16 426/237 |
| 2006/0075901 A1 | 4/2006 | Eustis | |
| 2009/0291175 A1 | 11/2009 | Wei et al. | |
| 2010/0092636 A1* | 4/2010 | Watson | C12G 3/07 426/533 |
| 2011/0070330 A1 | 3/2011 | Watson et al. | |
| 2011/0129589 A1* | 6/2011 | Watson | C12H 1/14 426/592 |
| 2011/0268838 A1 | 11/2011 | Vondrasek et al. | |
| 2012/0164300 A1* | 6/2012 | Niazi | C12G 3/07 426/592 |
| 2013/0149423 A1* | 6/2013 | Lix | C12H 1/16 426/397 |
| 2015/0197715 A1 | 7/2015 | Peniche | |
| 2016/0097023 A1 | 4/2016 | Peniche | |

OTHER PUBLICATIONS

English Machine Translation WO2011/114331 A2 (Year: 2011).*
Rubén del Barrio-Galán, et al. Effect of different aging techniques on the polysaccharide and phenolic composition and sensory characteristics of Syrah red wines fermented using different yeast strains. Food Chemistry 179 (2015) 116-126 2015 Elsevier Ltd.
M. Pomar, et al. Changes in Composition and Sensory Quality of Red Wine Aged in American and French Oak Barrels. J. Int. Sci. Vigne Vin, 2001, 35, n°1, 41-48 Vigne et Vin Publications Internationales (Bourdeaux, France).

* cited by examiner

| Oak Volatiles Panel | Aging method | | | Aroma/Flavor |
|---|---|---|---|---|
| | c) 5-year barrel aging | b) CO2 aging | a) without aging | |
| eugenol + isoeugenol | 131 | 363 | 98 | spicy, clove-like |
| 4-methylguaiacol | 15 | 76 | 16 | char-like and spicy, smoky |
| guaiacol | 139 | 72 | 93 | char-like, smoky |
| 5-Methylfurfural | 4679 | 13085 | 6258 | sweet, butterscotch, light |
| furfural | 6054 | 30124 | 4742 | caramel and faint almond- |
| trans-Oak lactone | 19 | 366 | 4 | |
| cis-Oak lactone | 240 | 3137 | 4 | fresh oak and coconut |
| vanillin | 11492 | 3766 | 254 | Vinilla |

FIG. 7

ACCELERATED SPIRIT/BEVERAGE AGING AND FLAVOR LOADING METHODS AND SYSTEMS

CROSS-REFERENCE TO RELATED APPLICATIONS

This application claims the benefit of U.S. Provisional Patent Application Ser. No. 62/420,506, filed on Nov. 10, 2016, the contents of which are incorporated herein by reference in its entirety.

FIELD OF THE INVENTION

The present invention relates to novel aging and flavor loading methods and systems for spirits and beverages. More specifically, the invention relates to a subcritical/critical/supercritical carbon dioxide ($CO_2$) process for the accelerated aging of spirits and beverages with wood materials, activated wood materials, and/or flavor impregnated wood materials.

BACKGROUND

Wood barrels have been widely used in the wine making industry for wine storage, transportation, and more importantly adding wood-derived complexities to the wine during the process (i.e. aging process). Aging alcoholic fluids in wood barrels undergo slow but complicated physical, chemical, and biological reactions which involve alcoholic fluids penetrating into the barrel wood, extracting soluble wood-derived compounds (wood-phenols and other volatile compounds) from the barrel, partially degrading wood barrel to further release wood-derived compounds, reacting of those compounds with compounds in spirits/beverages, the oxidation of components in spirits/beverages, and so forth. The overall aging process modifies spirits/beverages with appearance, smell, taste and other quality complexities. The barrel aging process depends largely on the barrel characteristics and takes years to achieve desirable flavors imparted by the wood barrels due to the fact that only a small percentage of wood barrel area contacts and reacts with the spirits/beverages. The wood staves are fire toasted prior to barrel cooperage or the barrel is fire toasted post cooperage, which leads to partial or total loss of certain wood flavors by the toasting process. Major drawbacks of wood barrel aging also include: the high cost of barrels and their maintenance, the loss of spirits/beverages by evaporation over the long aging duration, the risk of barrel leakage destroying the quality of spirits/beverages prior to the maturation, the risk of possible microorganism contamination during the aging process, and the large long-term inventory in stock. Therefore, an accelerated spirit/beverage aging method and/or system is demanded.

Accelerating spirit/beverage aging using wood materials depends on: 1) the availability and accessibility of wood-derived compounds; and 2) the reaction kinetics of the wood-derived compounds with the spirit/beverage. The accessibility to wood derived compounds depends on the direct contact of spirit/beverage with wood surfaces, the penetration of spirit/beverage into wood, and the diffusion of wood-derived compounds out of the wood into the spirits/beverages. In this aspect, the spirit/beverage contacting surface area and the open structure of the wood are critical. The larger surface area and more open porous structure increase the accessibility of reactants from the wood. The reaction kinetics is mainly impacted by the aging conditions including temperature, pressure, oxygen content, and the movement of spirits/beverages. A few patents disclosed methods to accelerate wine aging by either increasing the wood/spirit interaction area and/or improving the reaction conditions.

Wood fragments (plugs, dowels, rods, shavings, particles, granules, slabs, etc.) have been used as alternatives to barrel aging for spirits/beverages (U.S. Pat. Nos. 2,108,661, 2,203,229, 3,942,423, 4,350,708, 4,173,656, 4,956,194, 6,378,419). Compared to barrel aging, the use of wood fragments has larger spirit-wood contact area. Once the wood fragments are added to the spirits or beverages, the wood-phenols and other volatile compounds are absorbed by the spirits or beverages in the same manner as they are when in the wood barrel. With that, no costing wood barrel is required for aging. The spirit/beverage can be aged in any containers such as stainless steel, glass, plastic or used wood barrel. The entire process costs much less and goes to completion faster than the traditional wood barrel aging technique. It is noted, however, spirit/beverage aging using wood fragments is only able to achieve short term results since the reaction rate is not accelerated significantly due to the facts that the increase of surface area is macroscopic by physically reducing the wood dimensions and that the spirit/beverage is always saturated compared to the wood-derived compounds. Faster soak time also does not permit time dependent reactions of continuously released wood derived compounds from the barrel. In addition, the preparation of wood fragments (such as grinding or mechanical treatment) may damage the wood structures and lead to the partial loss or the distribution alteration of wood-derived compounds which can lead to off flavors. In addition, the fire toasting of small wood fragments is challenging to achieve desired and consistent flavor profiles.

U.S. Pat. No. 9,212,343 disclosed an apparatus with arrays of closely-spaced holes or cross-grain grooves on the inside of a wood barrel surface. With such a design, the exposure area was increased and the aging of liquids in such barrels could be accelerated. This method requires customized fabrication of barrel. The integrity and mechanical strength of barrel are weakened due to the holes or grooves.

U.S. Pat. No. 4,350,708 disclosed an accelerated process for aging an alcoholic beverage using aroma extracts from oak shavings. The oak shavings were extracted with alcohol-water to prepare first extract and demineralized water to prepare second extract. Two extracts were mixed and combined with alcoholic beverages to obtain aged flavors. The extraction and addition method cannot guarantee a full naturally balanced spectrum of wood-derived compounds reacted with alcoholic beverage for aging purposes. Therefore, the ultimate quality of alcoholic liquids from this aging method may not as good as the natural barrel-aged ones.

During the barrel-aging of spirits, some studies show linear increase of ethyl acetate over the entire aging time. Esterification is therefore considered one of the indicators for the spirit maturation and aging. Acceleration of esterification has been disclosed in a few patents and patent applications as methods of accelerating spirit aging. U.S. Pat. No. 6,869,630 disclosed an aging method of adding ethyl acetate to raw beverage prior to the aging process. US Pat. Appl. 20090291175 disclosed a method of using esterification catalysts for aging alcoholic liquids. Since esterification is only one of the numerous and complicated reactions occurred in the natural barrel-aging processes, a full spectrum of quality complexities cannot be obtained by only accelerating the esterification. The flavor of such aged beverages goes off flavor and is not equivalent to the natural barrel aged ones. Esterification process for spirit aging is essentially a chemical adulteration designed to meet the chemical analysis specifications.

U.S. Pat. No. 7,762,179 disclosed a system and a method which employs a device internally or externally to induce the motion of spirit or wine in wood barrel during the aging process. The increase in movement and circulation of wine is believed to accelerate the aging process to some extent. Speeding up reaction kinetics by this approach can lead to deleterious consequences i.e. off flavors.

Other aging acceleration methods include increasing oxygen inputs from hollow tube design as disclosed in U.S. Pat. No. 6,966,250, heating the aging alcoholic liquids up to 200° C. as disclosed in U.S. Pat. No. 6,869,630, and accelerating oxidation-reduction of wines using a silver/gold/copper alloy element as disclosed U.S. Pat. No. 7,571,673. All these aging acceleration methods don't achieve the same ultimate quality as the natural barrel aging process at the end.

With above disclosed methods for accelerated aging of wines and spirits, the ultimate quality of aged liquids is still not comparable to the natural barrel aging. An accelerated aging method or system which can age spirits/beverages equivalent to or better than the natural barrel aging process is wanted. In this present invention, innovative methods are disclosed to age spirits/beverages using activated wood materials and/or naturally flavored impregnated wood materials under a subcritical/critical/supercritical carbon dioxide environment. The method preserves the natural wood structures, increase the surface area both micro- and macroscopically, and imparts the full spectrum of natural wood flavors to spirits/beverages under a controlled and accelerated manner. The net result is equivalent to or better than and not contrary to the standard natural barrel aging process.

The wood materials can be activated with subcritical/critical/supercritical $CO_2$ processing. Activated wood materials can then be added to liquid under ambient, pressure, vacuum, and/or subcritical/critical/supercritical $CO_2$ environments. Fruits, vegetables, herbs, and other such natural products can also be added to the wood materials to impregnate the activated wood with naturally flavors, vitamins, minerals, therapeutics, and other nutrients, Impregnated wood materials can then be combined with liquid and treated with subcritical/critical/supercritical $CO_2$.

BRIEF SUMMARY OF THE INVENTION

It is an objective of the present invention to provide spirit/beverage aging methods and systems which accelerate the natural wood barrel aging process and reduce the aging time from years to months, weeks, days, hours, or minutes. The quality of spirits/beverages from innovative accelerated aging processes is equivalent to or exceeds barrel treated spirits/beverages that have aged for years.

It is a further objective to provide a method for aging spirit/beverage with wood materials in presence of subcritical/critical/supercritical carbon dioxide. The subcritical/critical/supercritical carbon dioxide fluid improves spirit/beverage penetration into and out of the wood materials and accelerates the reactions between the wood-derived compounds and the spirits/beverages.

It is a further objective to provide another method for aging spirit/beverage using wood materials which are activated via subcritical/critical/supercritical $CO_2$ treatment. In this embodiment, the wood materials are treated with subcritical/critical/supercritical carbon dioxide fluid and then soaked with spirits/beverages. The spirit/beverage is soaked with treated wood materials under negative pressure (vacuum), ambient pressure, or positive pressure.

It is a further objective of the present invention to provide a method of activating wood materials for spirit/beverage aging in presence of subcritical/critical/supercritical carbon dioxide conditions. The activation generates wood materials with a natural wood orientation, open porous structures, higher surface area and a transformation of wood-derived components.

In another objective of the present invention, the wood can be impregnated with natural compounds from natural entities (i.e. fruit, vegetables, herbs) in a subcritical/critical/supercritical environment. In this manner, the wood is activated and/or impregnated with natural flavors, natural vitamins, natural minerals, natural antioxidants, therapeutics, or the combination thereof.

It is another objective to provide a system for activating wood materials or aging spirits/beverages. The system comprises: a carbon dioxide supply device with a pump and a filter; a subcritical/critical/supercritical carbon dioxide reaction vessel with a temperature control element and a pressure monitor; a permeable container for holding wood and/or natural entities; carbon dioxide/spirit separation device(s), and a carbon dioxide recycle device.

It is another objective to provide a permeable container for containing wood and/or natural entities during the spirit/beverage aging processes. The device comprises: an individual package for wood and/or natural entities and a perforated plate which separates individual wood packages.

BRIEF DESCRIPTION OF THE DRAWINGS

FIG. 7 shows the content of oak volatiles and the corresponding aroma/flavor in Crystal tequila a) without aging; b) aged with oak wood chips in subcritical/critical/supercritical $CO_2$ for 1 cycle (2 hours); c) aged in oak wood barrel for 5 years. Units in μg/L.

DETAILED DESCRIPTION OF THE INVENTION

Figure 1:
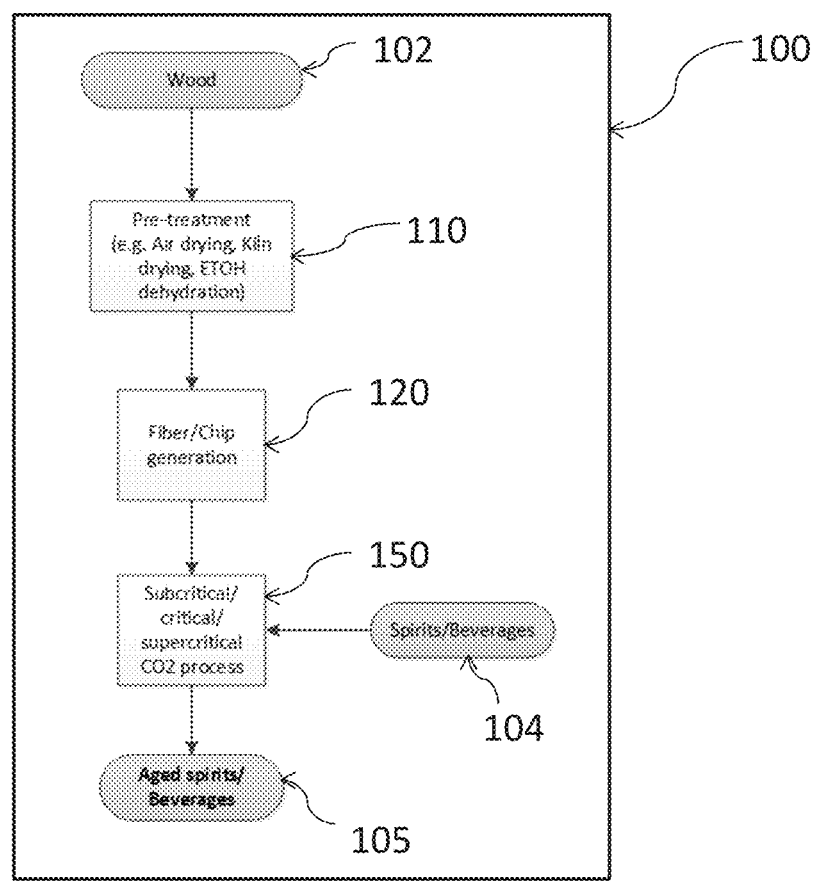
FIG. 1 illustrates a flow chart of spirits/beverages aging with wood and/or activated wood materials in an in-situ subcritical/critical/supercritical $CO_2$ process.

For the purposes of promoting an understanding of the principles of the disclosure, reference will now be made to certain embodiments and specific language will be used to describe the same. It will nevertheless be understood that no limitation of the scope of the disclosure is thereby intended, such alterations and further modifications in the illustrated methods of aging spirits and beverages, and such further applications of the principles of the disclosure as described herein being contemplated as would normally occur to one skilled in the art to which the disclosure relates.

Additionally, unless defined otherwise or apparent from context, all technical and scientific terms used herein have the same meanings as commonly understood by one of ordinary skill in the art to which this disclosure belongs.

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Similarly, when values are expressed as approximations, by use of the antecedent "about," it will be understood that the particular value forms another embodiment that is +/−10% of the recited value. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New accelerated aging and flavoring methods, systems, processes and apparatuses for spirits/beverages are discussed herein. The present application is directed to the use of subcritical/critical/supercritical fluid (e.g. carbon dioxide ($CO_2$)) and/or combinations of such in aging spirits or beverages with wood fibers/chips to significantly reduce aging time from years to months, weeks, days, hours, or minutes. Subcritical/critical/supercritical fluids such as carbon dioxide can be used to remove unnecessary wood lipids and contaminants to provide clean wood materials which can be further used for spirit and beverage aging. Subcritical/critical/supercritical $CO_2$ and/or combinations of such activates wood materials by opening up wood porous structure, increasing wood surface area, facilitates spirit liquid penetration into wood materials, adjusts the oxygen levels in spirits/beverages, and optimizes the pressure and/or temperature for the interaction between wood-derived components and spirits/beverages, thus accelerating aging reactions. At the end of the process, carbon dioxide is removed easily without leaving any unwanted/toxic residues in the spirits/beverages.

FIG. 1 illustrates a flow diagram of an in-situ aging process 100 for raw spirits/beverages 104 to obtain aged spirits/beverages 105. The process starts with wood materials 102 which can be fresh cut with various moisture contents or wood which has been dried or used previously in other applications. The wood materials are pre-treated in process step 110 and then are made into wood fibers and/or chips in step 120. Wood fibers and/or chips are mixed with raw spirits/beverages at step 150 in a subcritical/critical/supercritical carbon dioxide aging process to obtain aged spirits/beverages 105.

Figure 2:
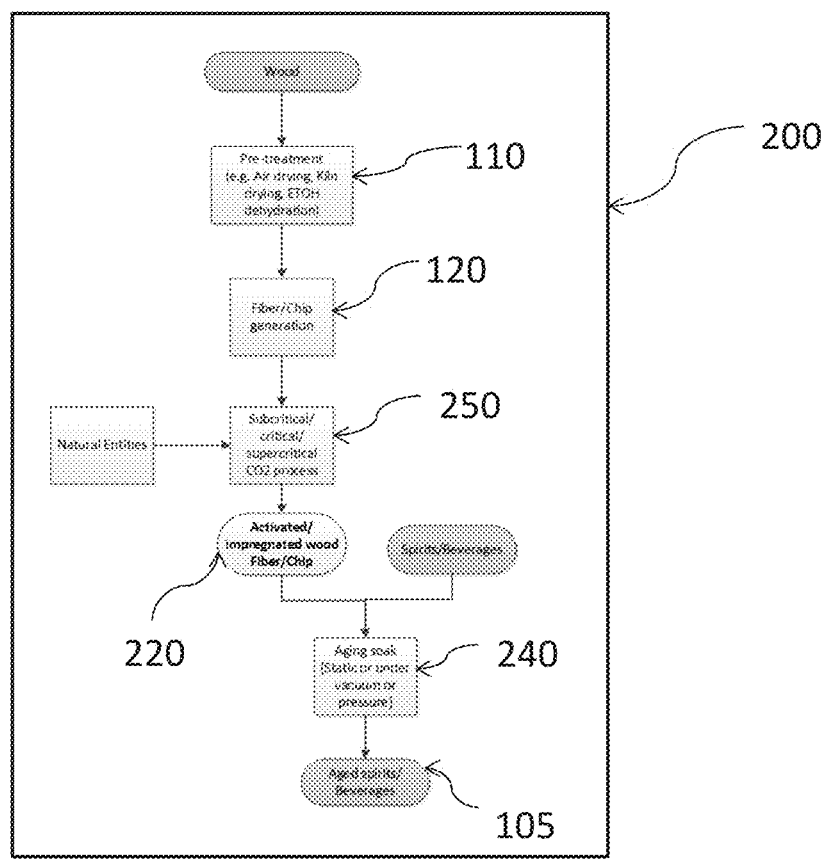
FIG. 2 illustrates a flow chart of spirits/beverages aging with subcritical/critical/supercritical $CO_2$ activated wood materials.

FIG. 2 illustrates a flow diagram of another process 200 for aging raw spirits/beverages 104 with activated wood fibers and/or chips 220 in an aging soak process step 240 to obtain aged spirit/beverage 105. The process starts with wood materials 102 which can be fresh cut with various moisture contents or wood which has been dried or used in other applications. The wood materials are pre-treated in process step 110 and then are made into wood fibers and/or chips in step 120. The wood fibers and/or chips are then activated with a subcritical/critical/supercritical carbon dioxide process at step 250. Raw spirits/beverages are soaked with activated wood fibers and/or chips in process step 240. In some embodiments, the aging soak step 240 can involve static, physical motion, agitation, vacuum or under positive pressures.

In some embodiments, the subcritical/critical/supercritical carbon dioxide process (step 150 in FIG. 1 and 250 in FIG. 2) are repeated multiple times. In some other embodiments, the two aging processes 100 and 200 are exchangeable and can be used together or combinations thereof.

The wood fibers/chips go through the process 100 can be re-cycled or re-used to age more spirits/beverages. Fresh wood fibers/chips can be added with the re-cycling wood fibers/chips to achieve desired flavor complexities.

In some embodiments, the wood can be impregnated with natural compounds from natural entities (i.e. fruit, vegetables, herbs) in a subcritical/critical/supercritical environment. In this manner, the wood is impregnated with natural flavors, natural vitamins, natural minerals, natural antioxidants, therapeutics, or the combination thereof.

The wood fibers/chips activated by using process step 250 can be re-activated or re-impregnated when the aging process 200 is completed. Fresh wood, activated wood and re-activated or re-impregnated wood fibers/chips can be combined to process 100 or 200 to age spirits/beverages with flavor complexities.

Figure 3:
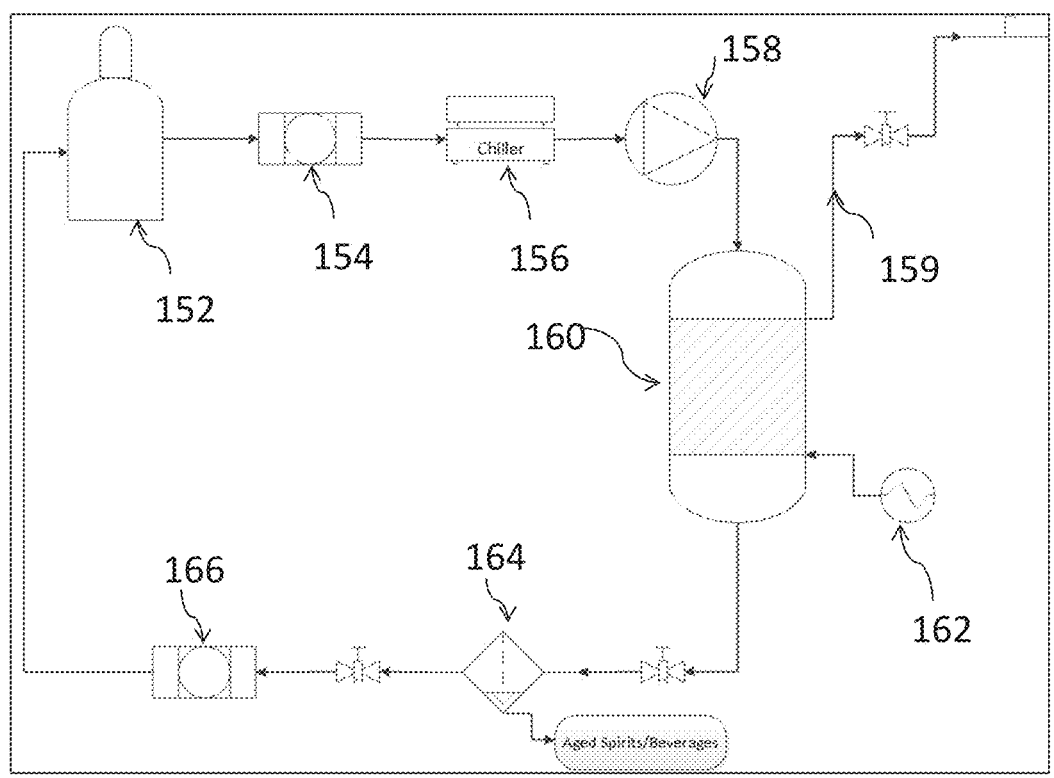
FIG. 3 is a simplified schematic of an embodiment of an apparatus or a system for spirits/beverages aging using subcritical/critical/supercritical $CO_2$.
Figure 4:
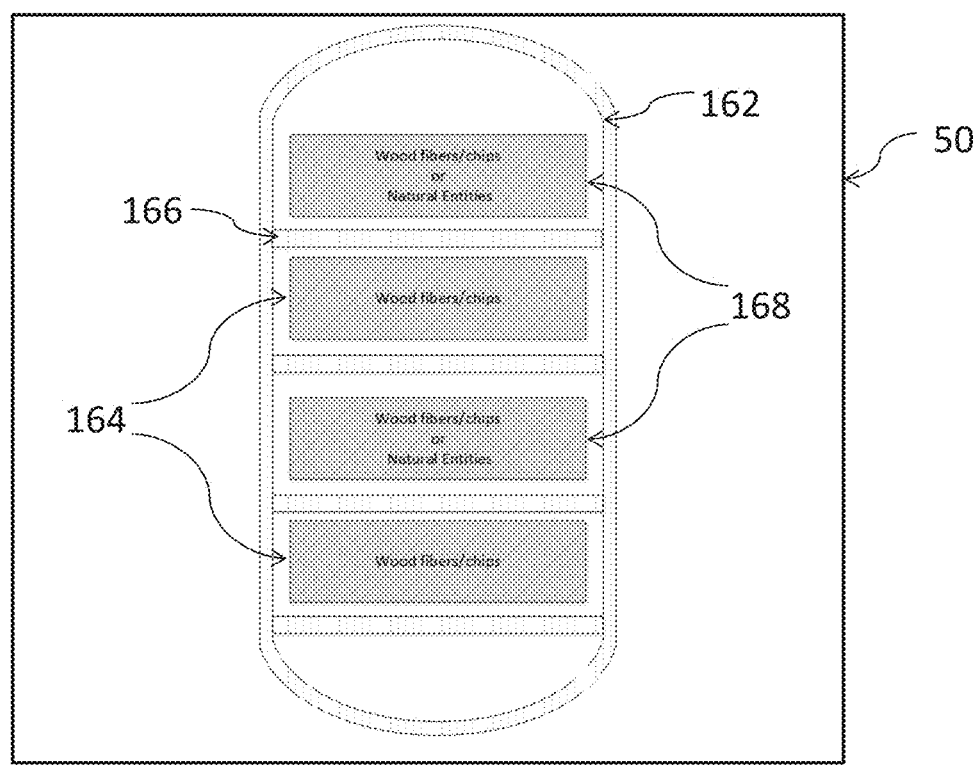
FIG. 4 is a simplified schematic of another embodiment of a device or a system for holding individual wood materials and/or natural entities in subcritical/critical/supercritical $CO_2$ aging of spirits/beverages.

FIG. 3 illustrates a flow chart of subcritical/critical/supercritical process step 150 in spirit/beverage aging process 100 as illustrated in FIG. 1. Carbon dioxide from a $CO_2$ supply device 152 is filtered through a filter 154 to remove particles and other impurities. It is then cooled by a chiller 156 and can be pressurized using a pump 158, Pressurized $CO_2$ is delivered into aging reactor 160 which is equipped with a heating element 162 and a pressure gauge. Inside the aging reactor 160, wood fibers and/or chips are packed in an apparatus 50 as illustrated in FIG. 4 and raw spirits/beverages are introduced. After the completion of spirit/beverage aging or maturation process, $CO_2$ is drained with spirits/beverages into fraction separator(s) 164 in which aged spirits/beverages are collected. The remaining $CO_2$ from separator 164 is purified and filtered by a purifying device 166 and then cycled back to CO₂ supply device 152 for repeated use.

In some embodiments, the liquid soaked wood materials after processes 100 and/or 200 can be returned to process 100 or 200 to age more or age other spirits/beverages. At the end, the liquid soaked in the wood materials can be collected using a process similar to process 100, except there is no raw spirits/beverage added.

FIG. 4 illustrates a device 50 designed for containing wood fibers/chips and/or natural entities which can be used in subcritical/critical/supercritical CO₂ activating/impregnating or aging processes 100 or 200. The device is a permeable cage 162 composed of perforated plates/mesh 166 and individual permeable compartments 164 for wood fibers/chips or 168 for natural entities. In some embodiments, the compartments for wood fibers/chips and natural entities are stacked alternatively. The device 50 is made from spirit/beverage compatible materials including but not limited to metals, stainless steels, polymeric materials, ceramics, wood, and etc. The individual wood fiber/chip container can be a Tyvek pouch, a paper pouch, a porous ceramic mesh, a porous polymer mesh, a porous metal mesh, a porous capsule and etc. The pore size of the individual wood fiber/chip container should prevent wood fines migrating into the spirits/beverages.

In various embodiments, the wood can be from oak, cherry, hickory, cedar, maple, redwood, palm, chestnut, acacia, apple, ash, alder, pecan, almond, peach, apricot, lemon, birth, beech, plum, walnut, grapefruit, sycamore, and the combination thereof. Also, driftwood from rivers or oceans can be used. Historic or re-claimed wood can also be used. Different wood types or combinations impart different flavors to spirits and beverages to be aged. Imparted flavors can be vanilla, buttery, caramel, nutty, clove, toasty, sweet tobacco, charcoal, smoky and the combination thereof. Imparted appearances are silky, creamy, bright, etc. Imparted tastes are clean, woody, smoothness, pepper, spicy, musky, cinnamon and etc. Combinations of various woods can be used. In some embodiments. CO₂ treated, naturally flavor impregnated wood, raw wood, CO₂ toasted or baked wood, charred wood, and etc. can be mixed together in the aging process.

The pre-treatment can be air drying, kiln drying or dehydration by gradient alcohols to remove extra moisture from wood materials. The pre-treatment of wood material is to reduce the moisture content to a level of lower than 13% to keep wood more stable during storage and/or for further treatment.

In various embodiments, the raw spirits 104 used in this invention include but are not limited to a red wine, a whiskey, a brandy, a vodka, a tequila, a scotch, a rum, a bourbon, a beer, a rice wine, and an eau de vie. The raw beverages can include tea, coffee, juices, sports drinks, energy drinks etc.

The fiber/chip generation step 120 can employ manual splitting, cutting, pressing, milling and other methods to generate wood fibers with high area to volume ratio. The fibers have a high length to thickness ratio ranging from 2:1, 5:1, 10:1, 25:1, 50:1 to 100:1. The high length to thickness ratio provides wood fibers with high surface areas which interface with spirits/beverages during aging processes. The surface area of wood fibers/chips can range from 2 times, 5 times, 10 times, 50 times, 100 times, 1000 times, 10,000 times compared to the wood barrel surface areas. The wood fibers and/or chips generated by this method in this invention largely preserve the natural orientation of the wood.

In some embodiments, the wood fibers/chips can be toasted or baked pre- or post-subcritical/critical/supercritical carbon dioxide process. The toasting or baking process can modify the wood fiber/chip surfaces. The toast/bake temperature is ranged from 100° C., 150° C., 200° C., to 250° C., 300° C., 350° C., 400° C., 450° C., 500° C. and 600° C. The toast/bake time is ranged from 5, 10, 20, 30, 40, 50, 60 minutes to 2, 3, 4, 5, 6, 8, 10, 12, 18, 24, 36, 48 and 96 hours.

The subcritical/critical/supercritical CO₂ aging process is applied to wood fibers and/or chips at step 150 in presence of raw spirits/beverages 104. In some embodiments, the wood fibers and/or chips and spirits are subjected to subcritical/critical/supercritical treatment 150 which is carried out using carbon dioxide as illustrated in FIG. 3. The critical point for carbon dioxide is 304.25K at 7.39 MPa or 31.1° C. at 1072 psi or 31.2° C. and 73.8 bar. To perform subcritical/critical/supercritical treatment, the temperature and pressure may continue to be raised, for example to 40° C. with corresponding pressure of 85 bar. In the embodiment illustrated in FIG. 3, the temperature in step 150 at which the supercritical treatment occurs is raised to 105° C. with corresponding pressure of 600 bar. The aging duration under critical/supercritical condition can last from 5 minutes to 12 months.

In some embodiments, the subcritical/critical/supercritical aging cycle can be repeated more than once. When one aging cycle is completed, CO₂ gas is released partially or completely and the system is cooled down. Fresh CO₂ can be introduced and the subcritical/critical/supercritical aging cycle can be repeated multiple times. After CO₂ processing, oxygen can be introduced to pressure vessel to provide oxide coating on the surface of the wood.

In some embodiments, the subcritical/critical/supercritical CO₂ process can occur for wood fibers and/or chips prior to introducing spirits/beverages at step 150 as illustrated in FIG. 1. The subcritical/critical/supercritical CO₂ process for wood fibers and/or chips acts as a cleaning process to remove impurities, foreign matters or surface contaminations from wood materials. In some embodiments, liquid CO₂ can be used to flush through the wood materials.

The subcritical/critical/supercritical CO₂ process is applied to wood fibers and/or chips at step 250 to activate wood fibers/chips In some embodiments, the wood fibers and/or chips are subjected to sub critical/critical/supercritical treatment 250 which is carried out using carbon dioxide as illustrated in FIG. 3. The critical point for carbon dioxide is 304.25K at 7.39 MPa or 31.1° C. at 1072 psi or 31.2° C. and 73.8 bar. To perform subcritical/critical/supercritical CO₂ treatment, the temperature and pressure may continue to be raised above critical point, for example to 32° C., 40° C., 60° C., 80° C., 100° C., 200° C., 300° C., 400° C., 500° C. or 600° C. with corresponding pressure of up to 1000 bar. The aging duration under subcritical/critical/supercritical condition can last from 1 minute to 30 days. The CO₂ treatment further increases the surface areas of the wood fibers 1.1 times, 5 times, 10 times, 50 times, 100 times, 1000 times, 10,000 times as compared to fibers without CO₂ treatment or fibers having other traditional treatments such as air drying, kiln drying and etc. The further surface area increase is achieved by opening up porosity and pore interconnectivity. In some other embodiments, critical/supercritical CO₂ treatment of wood fibers also activates wood materials by bringing wood-derived compounds to the wood surface and/or modifying the wood at supercritical conditions. The subcritical/critical/supercritical CO₂ activation processes for wood fibers/chips can be performed multiple times at different programmed temperature and pressure for different durations since different wood-derived compounds are activated with different programs/parameters.

In some embodiments in the process 200 as illustrated in FIG. 2, a vacuum environment (negative pressure) can be applied to the soaking step 240. The vacuum environment can range from 800 mTorr, 500 mTorr, 200 mTorr, 100 mTorr, to 50 mTorr. The vacuum environment regulates the oxygen content in the soaking mixture and also improves the penetration of spirits/beverages into wood materials. The vacuum is kept for a period of duration for the spirit/beverage aging and maturation from 5 minutes, 2 hours, 1 day, to 3 months. In some other embodiments, vacuum (negative pressure) processing can be applied multiple times to further optimize the spirits/beverages aging process.

In some other embodiments in the process 200 as illustrated in FIG. 2, positive pressure can be applied at soaking step 240. A mixture of air and/or inert atmospheres is pumped into the wood fiber-spirit system to facilitate penetration. The pressure of the soaking system is kept from 1 bar, 5 bar, 10 bar, 50 bar, 100 bar, to 500 bar for duration from 5 minutes, 2 hours, 1 day, to 3 months. In some other embodiments, the pressurization and de-pressurization process can be applied multiple times to further adjust the spirits/beverages aging process. The inert atmospheres can be $CO_2$, N2, Ar, and etc. In some other embodiments, the pressurization can be achieved by using subcritical/critical/supercritical $CO_2$. In some other embodiments, the vacuum (negative pressure) and positive pressure can be cycled multiple times to age the spirits/beverages.

During the aging process, the wood to spirit ratio is important for the ultimate quality of aged spirits/beverages and the aging rate of the process. Depending on the wood type selected and spirit/beverage used, the wood to spirit/beverage ration can be ranged from 0.1 g/L, 5 g/L, 10 g/L, 50 g/L, 100 g/L to 500 g/L.

EXAMPLES

Example 1

Figure 5:
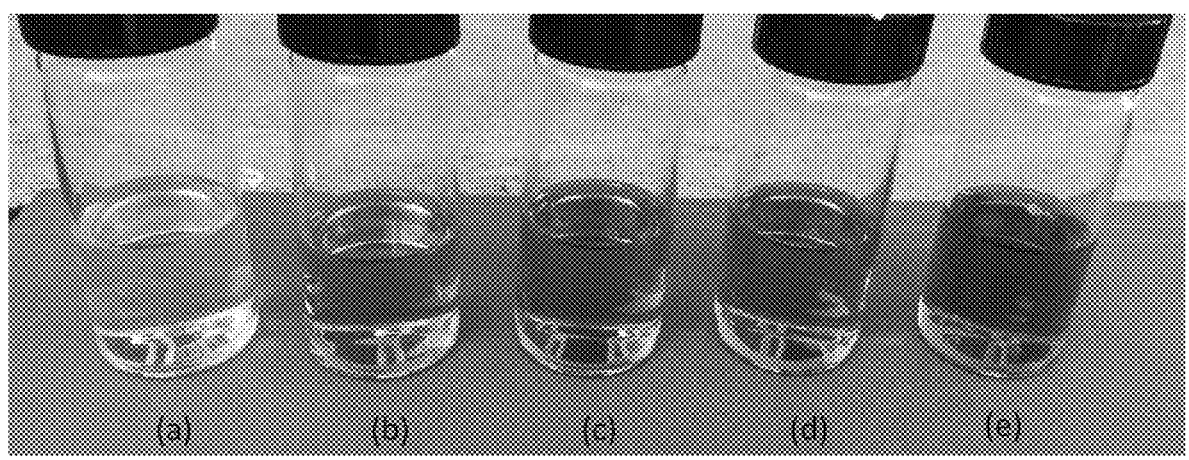
FIG. 5 shows tequila a) without aging (Crystal); b) aged by soaking with wood chips for 12 month at ambient conditions; c) aged with wood chips in subcritical/critical/supercritical $CO_2$ for 1 cycle (2 hours); d) aged in a wood barrel for 5 years; and (e) aged with wood chips in subcritical/critical/supercritical $CO_2$ for 1 cycle (2 hours) followed by 3 weeks of further aging at room temperature.

100% agave tequila (Crystal, distilled without aging) was obtained from a liquor store. About 0.5 g oak wood chip was soaked in about 50 ml Crystal tequila under two different conditions. The first condition was in a closed jar and the jar was stored at room temperature for about 12 months. The second condition was placed in a $CO_2$ chamber which went through a subcritical/critical/supercritical aging process. The final aging temperature and pressure were kept at about 55° C. and 1500 psi, respectively. The overall cycle time was about 2 hours. After subcritical/critical/supercritical $CO_2$ aging, half of the resulting tequila was separated from the wood and stored in a jar. The wood and the rest of tequila were stored together in a jar at room temperature for about 3 weeks to further age the tequila. The appearance of the aged tequila samples from those two methods was compared to the original Crystal (without aging) and the 5-year barrel aged one. FIG. 5 showed the appearance of those 5 groups. All aged tequila samples developed golden color. The subcritical/critical/supercritical $CO_2$ aged tequila (c) is close to 5-year barrel aged tequila (d) in color and appearance. With 3-week soaking after subcritical/critical/supercritical $CO_2$ aging, the tequila sample (e) further developed color from golden to slightly reddish. Samples (c), (d), and (e) all have more appealing golden color and rich appearance compared to the 12-month chip aged tequila (b).

Example 2

Figure 6:
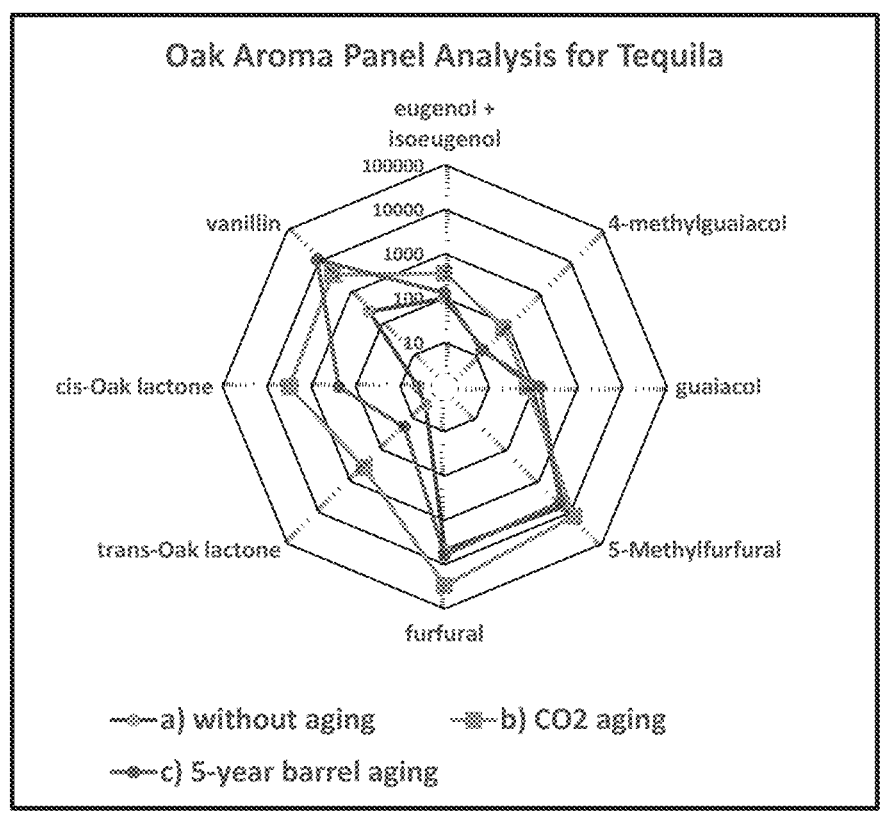
FIG. 6 shows the aroma panel results of Crystal tequila a) without aging; b) aged with oak wood chips in subcritical/critical/supercritical $CO_2$ for 1 cycle (2 hours); c) aged in oak wood barrel for 5 years. Units in μg/L.

The tequila groups (a), (c) and (d) from Example 1 were analyzed with the oak aroma panel by HPLC/MS at ETS laboratories. The results were shown in FIG. 6. Subcritical/critical/supercritical $CO_2$ aged tequila has oak volatiles concentration close to the 5-year barrel aged one. There was significant increase in 5-methylfurfural, furfural, and oak lactone compared to both Crystal and 5-year aged tequila. These volatiles give the aged tequila sweet, butterscotch, fresh oak and coconut aroma/flavor as shown by FIG. 7. The content of vanillin in supercritical aged tequila increased about 12 times compared Crystal. Although it was still lower than that from the 5-year barrel aged tequila, it can be adjusted by the oak wood type, the toast condition and the subcritical/critical/supercritical $CO_2$ cycle conditions.

The foregoing descriptions have been presented for purposes of illustration and description, and are not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although the invention has been described with reference to preferred embodiments, persons skilled in the art will recognize that changes may be made in form and detail without departing from the spirit and scope of the invention.

What is claimed is:

1. A method of accelerating the aging of a spirit or beverage, the method comprising the steps of:
   providing a beverage or spirit;
   providing wood chips or fibers;
   contacting and treating the beverage or spirit with said wood chips or fibers in a processing vessel, in the presence of carbon dioxide wherein the carbon dioxide conditions are selected from the group consisting of subcritical, critical or supercritical conditions wherein the contact time under said conditions is between 5 minutes to 24 hours to produce an aged spirit or beverage;
   removing said treated beverage or spirit and wood fibers or chips from said processing vessel and storing in a second vessel or glass container for a period of time up to 6 months.

2. The method of claim 1, wherein said wood fibers or chips are selected from the group consisting of oak, chestnut, lemon, berry, beech and a combination thereof.

3. The method of claim 1, wherein the wood fibers or chips is subjected to heat treatment prior to contact with said spirit or beverage.

4. The method of claim 3, wherein said wood fibers or chips heat treatment is selected from the group consisting of toasting, charring and baking at a temperature from 60° C. to 500° C. for 5 minutes to 96 hours.

5. The method of claim 1, wherein said spirit is selected from the group consisting of tequila, red wine, whiskey, scotch, brandy, vodka, rum, bourbon, beer, rice and eau de vie.

6. The method of claim 1, wherein said beverage is selected from the group consisting of tea, sport drinks, energy drinks, coffee, juice and water.

7. The method of claim 1, wherein the carbon dioxide conditions for subcritical, critical or supercritical conditions is at a pressure from 50 bar to 600 bar and a temperature from 20° C. to 150° C.

8. The method of claim 1, wherein the ratio of wood fibers or chips to spirit or beverage is from 1:1 to about 1:10,000.

9. The method of claim 1, wherein the contacting and treating step is repeated one or more times.

10. The method of claim 1, wherein said wood fibers or chips are re-used or re-cycled with fresh wood fibers or chips.

11. The method of claim 1, wherein the wood fibers or chips are pretreated by impregnation with flavorants.

12. The method of claim 11, wherein the flavorant is selected from the group consisting of herbs, fruits, vegetables, flowers and mixtures thereof.

13. A method of accelerating the aging of a spirit or beverage, the method comprising the steps of:
- providing a beverage or spirit;
- providing wood chips or fibers;
- soaking said wood chips or fibers in carbon dioxide wherein the conditions for soaking are under subcritical or critical or supercritical conditions;
- contacting said soaked wood chips or fibers with said beverage or spirit;
- removing said treated beverage or spirit and wood fibers or chips from said processing vessel and storing in a second vessel or glass container for a period of time up to 6 months.

14. The method of claim 13, wherein said subcritical, critical or supercritical soaking conditions is conducting at a pressure from 50 bar to 60 bar and a temperature from 20° C. to 600° C. and wherein the soaking time is from 5 minutes to 96 hours.

15. The method of claim 13, wherein the soaking step is conducted under vacuum conditions from about 800 mTorr to 50 mTorr.

16. The method of claim 13, wherein the soaking step is conducted under positive pressure from about 2 bar to 500 bar.

17. The method of claim 13, wherein said soaking step is conducted one or more times.

18. The method of claim 13, wherein said contacting step is conducted one or more times.

19. The method of claim 13, wherein said soaked wood fibers or chips are re-treated after completing said aging process.

* * * * *